(12) United States Patent
Yamauchi et al.

(10) Patent No.: US 7,687,184 B2
(45) Date of Patent: Mar. 30, 2010

(54) MEMBRANE ELECTRODE ASSEMBLY WITH A FIBROUS SUBSTRATE, METHOD FOR PRODUCING THE SAME AND POLYMER ELECTROLYTE FUEL CELL

(75) Inventors: Masaki Yamauchi, Osaka (JP); Yoshihiro Hori, Nara (JP); Akihiko Yoshida, Osaka (JP); Mikiko Yoshimura, Tokyo (JP); Makoto Uchida, Osaka (JP)

(73) Assignee: Panasonic Corporation, Osaka (JP)

( * ) Notice: Subject to any disclaimer, the term of this patent is extended or adjusted under 35 U.S.C. 154(b) by 907 days.

(21) Appl. No.: 10/583,374

(22) PCT Filed: Sep. 22, 2005

(86) PCT No.: PCT/JP2005/017503

§ 371 (c)(1),
(2), (4) Date: Jun. 19, 2006

(87) PCT Pub. No.: WO2006/043394

PCT Pub. Date: Apr. 27, 2006

(65) Prior Publication Data

US 2008/0311462 A1    Dec. 18, 2008

(30) Foreign Application Priority Data

Oct. 19, 2004   (JP)   ............... 2004-304074

(51) Int. Cl.
   *H01M 4/00*   (2006.01)
   *H01M 8/10*   (2006.01)
(52) U.S. Cl. ................ 429/41; 429/30; 429/44
(58) Field of Classification Search ............ None
   See application file for complete search history.

(56) References Cited

U.S. PATENT DOCUMENTS

2003/0003342 A1   1/2003   Sugita et al.

(Continued)

FOREIGN PATENT DOCUMENTS

JP    5-174845 A    7/1993

(Continued)

OTHER PUBLICATIONS

English Translation of Chinese Office Action issued in Chinese Patent Application No. CN 2005800091226, issued on Jan. 18, 2008.

*Primary Examiner*—Dah-Wei D Yuan
*Assistant Examiner*—Kwang Han
(74) *Attorney, Agent, or Firm*—McDermott Will & Emery LLP

(57) ABSTRACT

In a conventional polymer membrane electrode assembly, particularly when operated for a long period of time, a portion of the polymer electrolyte membrane to be in contact with the gas diffusion layer has suffered significant degradation. In order to address this, in a membrane electrode assembly including a hydrogen ion conductive polymer electrolyte membrane, a pair of catalyst layers arranged on both surfaces of the polymer electrolyte membrane, and a pair of gas diffusion layers, each including a fibrous substrate, arranged on the outer surfaces of the catalyst layers, a thickness $T_A$ of a center portion that faces the catalyst layer and a thickness $T_B$ of a peripheral portion surrounding the center portion are set to satisfy a expression (1):

$$0.7 \leq T_B/T_A \leq 0.9.$$

12 Claims, 4 Drawing Sheets

U.S. PATENT DOCUMENTS

2004/0058223 A1    3/2004  Shibata et al.
2005/0142430 A1*   6/2005  Yoshida et al. ................ 429/44
2005/0233203 A1*  10/2005  Hampden-Smith et al. .... 429/44

FOREIGN PATENT DOCUMENTS

| | | |
|---|---|---|
| JP | 6-295728 A | 10/1994 |
| JP | 7-220742 A | 8/1995 |
| JP | 8-124583 A | 5/1996 |
| JP | 8-185872 A | 7/1996 |
| JP | 8-185881 A | 7/1996 |
| JP | 10-289722 A | 10/1998 |
| JP | 2000-215903 A | 8/2000 |
| JP | 2002-208413 A | 7/2002 |
| JP | 2002-305008 A | 10/2002 |
| JP | 2004-87491 A | 3/2004 |
| JP | 2004-87505 A | 3/2004 |
| JP | 2005-235736 A | 9/2005 |
| WO | WO 03/081700 | * 10/2003 |

* cited by examiner

Large thread diameter (thick) $D_B$　　Small thread diameter (thin) $D_A$

Small thread count

Large thread count

Large thread count   Small thread count

MEMBRANE ELECTRODE ASSEMBLY WITH A FIBROUS SUBSTRATE, METHOD FOR PRODUCING THE SAME AND POLYMER ELECTROLYTE FUEL CELL

RELATED APPLICATIONS

This application is the U.S. National Phase under 35 U.S.C. § 371 of International Application No. PCT/JP2005/017503, filed on Sep. 22, 2005, which in turn claims the benefit of Japanese Application No. 2004-304074, filed on Oct. 19, 2004, the disclosures of which Applications are incorporated by reference herein.

TECHNICAL FIELD

The present invention relates to a membrane electrode assembly, a method for producing the membrane electrode assembly, and a polymer electrolyte fuel cell comprising the membrane electrode assembly.

BACKGROUND ART

Polymer electrolyte fuel cells generate electricity and heat simultaneously by allowing fuel gas (reaction gas) such as hydrogen and oxidant gas (reaction gas) such as air to electrochemically react with each other on a gas diffusion electrode having a catalyst layer containing an electrode catalyst (e.g., platinum) with the use of a hydrogen ion conductive polymer electrolyte membrane that selectively transports cations (hydrogen ions). FIG. 8 shows the typical structure of a polymer electrolyte fuel cell.

In a polymer electrolyte fuel cell 200, to both surfaces of a polymer electrolyte membrane 101 are attached catalyst layers 102A and 102B each composed mainly of a carbon powder carrying an electrode catalyst (e.g., platinum metal). To the outer surfaces of the catalyst layers 102A and 102B are attached a pair of gas diffusion layers 111A and 111B each comprising a fibrous substrate 104A, 104B and a water-repellent carbon layer (covering layer) 103A, 103B. The water-repellent carbon layers 103A and 103B have current collecting capability, gas permeability and water repellency. The catalyst layer 102A, 102B and the gas diffusion layer 111A, 111B are combined respectively to form gas diffusion electrodes. The polymer electrolyte membrane 101, the catalyst layers 102A and 102B, and the gas diffusion layers 111A and 111B are combined to form a membrane electrode assembly (MEA) 105.

To mechanically fix the membrane electrode assembly 105 and to connect adjacent MEAs 105 in series to each other, conductive separator plates 106A and 106B are inserted between MEAs 105. The separator plates 106A and 106B each have a gas flow channel 107A, 107B for supplying fuel gas or oxidant gas to the catalyst layer of fuel electrode or oxidant electrode on one surface thereof and a cooling water flow channel 108 for cooling the MEA 105 on the other surface thereof. Further, sealants 109 for preventing the reaction gas from leaking out are arranged.

The MEA 105 and a pair of separator plates 106A and 106B are combined to form a unit cell. A plurality of unit cells are stacked to form a cell stack. The cell stack is clamped in the stacking direction with clamping bolts 110 at a set clamping pressure so as to prevent fuel gas or oxidant gas from leaking or to reduce contact resistance in the stack. Accordingly, the MEA 105 is in surface contact with the separator plates 106A and 106B at a predetermined pressure.

In order to effectively utilize the reaction area of catalyst layer and to yield high cell output, or to improve assembly efficiency during the assembly of MEAs, usually, a structure as shown in FIG. 8 is employed. The main surfaces of the gas diffusion layers 111A and 111B is one size larger than those of the catalyst layers 102A and 102B. In the center portion of the gas diffusion layer 111A, 111B is placed the catalyst layer 102A, 102B. Accordingly, the perimeter (peripheral portion) of the gas diffusion layer 111A, 111B is positioned outside the main surface of the catalyst layer 102A, 102B (see, e.g., Patent Document 1).

However, the above conventional technique is accompanied by a problem: the peripheral portion of the gas diffusion layer 111A, 111B comes in direct contact with the polymer electrolyte membrane 101 at both fuel electrode side and air electrode side, so that the asperity on the surface of the peripheral portion of the gas diffusion layer 111A, 111B is likely to cause damage to the polymer electrolyte membrane 101 particularly during long-term operation. The surface asperity of the peripheral portion of the gas diffusion layer 111A, 111B is due to the structure and shape of the fibrous substrate 104A, 104B, and the above-described problem occurs regardless of the presence or absence of the water repellent carbon layer 103A, 103B.

Further, a cell stack of a conventional polymer electrolyte fuel cell is often clamped in the stacking direction at four points with clamping bolts 110, nuts (not shown) and clamping plates such that pressure is applied uniformly to the surface of the membrane electrode assembly 105 so as to reduce contact resistance. It is difficult to apply pressure uniformly throughout the surface of the membrane electrode assembly by the four-point clamping, however. The pressure applied to the portions where the clamping bolts 110 are positioned, i.e., the pressure applied to the peripheral portion of the gas diffusion layer 111A, 111B, is higher than the pressure applied to the center portion of the gas diffusion layer 111A, 111B. As such, a tendency is apparent, at both fuel electrode side and air electrode side, in which the peripheral portion of the gas diffusion layer 111A, 111B contacts the polymer electrolyte membrane 101 directly and more firmly, and the polymer electrolyte membrane 101 is likely to suffer damage.

If the polymer electrolyte membrane 101 is damaged, causing a through hole large enough to allow the reaction gas to leak, oxidant gas may be introduced into fuel gas, or fuel gas may be introduced into oxidant gas. If the mixed gas caused by the leakage is reacted by the action of the electrode catalyst, its reaction heat will cause further damage to the polymer electrolyte membrane 101. This may cause a decrease in output voltage or a termination of operation. Even if the damage is not so severe as to cause reaction gas leakage, there is a possibility that an electrical short-circuit might be caused between the fuel electrode and the air electrode. In this case also, the problem of a decrease in output voltage occurs.

As another approach, Patent Documents 2 and 3, for example, propose methods for solving the above problems in which a thin resin film having a thickness of several ten μm is formed on the peripheral portion of the catalyst layers so as to protect the polymer electrolyte membrane from the gas diffusion layers.

Patent Document 4 proposes a technique for protecting the peripheral portion of the polymer electrolyte membrane from damage by increasing the thickness of the peripheral portion relative to that of the center portion, in other words, the portion to be in contact with the catalyst layer (electrode reaction area) while maintaining the proton conductivity in the electrode reaction area.

Furthermore, Patent Document 5 proposes a technique to produce a polymer electrolyte membrane comprising a center portion made of hydrogen ion conductive material and a peripheral portion made of non-hydrogen ion conductive material resistant to shearing stress and heat.

Patent Document 1: JP 2002-208413 A
Patent Document 2: JP 5-174845 A
Patent Document 3: JP 8-185872 A
Patent Document 4: JP 8-185881 A
Patent Document 5: JP 2000-215903 A

DISCLOSURE OF INVENTION

Problem that the Invention is to Solve

However, in the techniques proposed by Patent Documents 2 and 3, during the production of a membrane electrode assembly, it is difficult to form a thin resin film having a thickness of several ten μm on the peripheral portion of the catalyst layer without creating a gap, and the resin film and the catalyst layer are not aligned properly, leaving a gap between the resin film and the catalyst layer. In such case, the gap causes damage to the polymer electrolyte membrane, failing to obtain the effect of the resin film.

Furthermore, in the technique proposed by Patent Document 4, it is likely to cause a nonuniform thickness in the center portion and the peripheral portion during the production of a polymer electrolyte membrane. More specifically, thick island-like regions may be formed on the center portion that should be thin during the production of a polymer electrolyte membrane, resulting in a decrease in ion conductivity. Alternatively, the peripheral portion that should be thick may become partially thin, causing further damage to the polymer electrolyte membrane. There also is another problem: because the peripheral portion of the polymer electrolyte membrane is thick, sufficient clamping pressure cannot be applied between the center portion of the polymer electrolyte membrane and the catalyst layers, and thus contact resistance tends to be high.

In the technique proposed by Patent Document 5, in order to increase the strength of the peripheral portion of the polymer electrolyte, the polymer electrolyte membrane is produced by impregnating a substrate comprising a paper made of polytetrafluoroethylene (PTFE) with an ion conductive solution. For this reason, sufficient proton conductivity cannot be obtained.

In view of the above problems, an object of the present invention is to provide a membrane electrode assembly, including gas diffusion layers each comprising a fibrous substrate, that can easily and certainly provide a polymer electrolyte fuel cell in which damage to a polymer electrolyte membrane and output decrease caused by the damage are not likely to occur.

Another object of the present invention is to provide a polymer electrolyte fuel cell, in which output decrease is not caused in long-term operation, by using the membrane electrode assembly comprising gas diffusion layers each comprising a fibrous substrate, in which damage to a polymer electrolyte membrane is not likely to occur.

Means for Solving the Problem

For achieving the above objects, the present inventors conducted extensive studies and found that, in the long-term operation of a fuel cell comprising a cell stack including a membrane electrode assembly having gas diffusion layers each including a fibrous substrate, damage to the polymer electrolyte membrane caused by the asperity of the fibrous substrate of the gas diffusion layers during the clamping of the cell stack is one of the causes for the cell output decrease. The present inventors also found that, particularly when the main surface of the fibrous substrate has a larger area than that of the catalyst layer, adjustment of the thickness of the peripheral portion of the fibrous substrate and the center portion thereof facing the catalyst layer such that the asperity of the peripheral portion does not cause damage to the polymer electrolyte membrane is extremely effective to achieve the above objects. On the basis of the findings, the present invention has been accomplished.

More specifically, the present invention provides a membrane electrode assembly comprising a hydrogen ion conductive polymer electrolyte membrane, a pair of catalyst layers arranged on both surfaces of the polymer electrolyte membrane and a pair of gas diffusion layers, each including a fibrous substrate, arranged on the outer surfaces of the catalyst layers, characterized in that, in the fibrous substrate, a thickness $T_A$ of a center portion that faces the catalyst layer and a thickness $T_B$ of a peripheral portion surrounding the center portion have a relation represented by the following expression (1):

$$0.7 \leq T_B/T_A \leq 0.9 \tag{1}.$$

As used herein, the main surface of the fibrous substrate means a surface of the fibrous substrate in the polymer electrolyte membrane side. Likewise, the main surface of the catalyst layer means a surface of the catalyst layer in the fibrous substrate side and the other surface in the polymer electrolyte membrane side. In the membrane electrode assembly of the present invention, similar to a conventional polymer electrolyte fuel cell, the main surface of the fibrous substrate has a larger area than that of the catalyst layer, and the area of the polymer electrolyte membrane is larger than that of the main surface of the fibrous substrate.

Further, the center portion of the fibrous substrate means a portion that faces the catalyst layer (portion in contact with the catalyst layer) when the catalyst layer is arranged in the center of the main surface of the fibrous substrate. Likewise, the peripheral portion of the fibrous substrate means a portion positioned at the surrounding of the center portion with which the catalyst layer does not come in contact.

As described above, by making the area of the main surface of the fibrous substrate larger than that of the main surface of the catalyst layer and, in the fibrous substrate, setting the thickness $T_A$ of the center portion facing the catalyst layer and the thickness $T_B$ of the peripheral portion surrounding the center portion so as to satisfy a relation represented by the following expression (1) (i.e., the value of the expression (1) should be not less than 0.7 and not greater than 0.9), it is possible to protect the polymer electrolyte membrane from damage caused by the asperity of the fibrous substrate of the gas diffusion layer during the clamping of the cell stack. It is thus possible to easily and surely construct a membrane electrode assembly capable of preventing output decrease caused by the damage of the polymer electrolyte membrane. Moreover, the incorporation of the membrane electrode assembly into a polymer electrolyte fuel cell sufficiently prevents the cell output decrease during long-term operation.

If the value of $\{T_B/T_A\}$ of the expression (1) exceeds 0.9, the peripheral portion of the fibrous substrate contacts the polymer electrolyte membrane too firmly during the clamping of the cell stack, and therefore the effect of the present invention to protect the polymer electrolyte membrane from damage cannot be achieved sufficiently. Conversely, if the value of $\{T_B/T_A\}$ of the expression (1) is less than 0.7, the peripheral portion of the fibrous substrate will be much thinner than the center portion, which increases the contact resistance of the peripheral portion during power generation, resulting in deterioration of power generation performance. Further, the pressure applied to the center portion during the clamping of the cell stack will be large, accelerating degradation of the polymer electrolyte membrane. For the calculation of the value of $\{T_B/T_A\}$, the values of $T_A$ and $T_B$ should be expressed in the same unit.

The thickness $T_A$ of the center portion and the thickness $T_B$ of the peripheral portion of the fibrous substrate of the membrane electrode assembly of the present invention can be measured according to JIS L 1096 (Testing Method for Woven Fabrics). JIS L 1096 (Testing Method for Woven Fabrics) provides accurate thickness measurement of various substrates for gas diffusion layers for use in various fuel cells. More specifically, the thickness $T_A$ of the center portion and the thickness $T_B$ of the peripheral portion of the fibrous substrate in the membrane electrode assembly of the present invention are values measured under a condition where a predetermined pressure which is described below is applied to the fibrous substrate. As such, the thickness $T_A$ of the center portion and the thickness $T_B$ of the peripheral portion of the fibrous substrate in the membrane electrode assembly of the present invention are equal to a thickness $T_A$ of the center portion of the gas diffusion layer comprising the fibrous substrate that faces the catalyst layer and a thickness $T_B$ of the peripheral portion surrounding the center portion, respectively.

Specifically, a circular test piece having a diameter of 50 mm is obtained by punching the fibrous substrate using a punch. The test piece is placed between two reference plates larger than the test piece, to which a pressure of 1 MPa is applied continuously. Thirty seconds after the continuous application of the pressure, the scale between the reference plates is read using a thickness gauge (while the pressure is applied). The thus-obtained value represents a thickness of the fibrous substrate. In the present invention, the thickness $T_A$ of the center portion and the thickness $T_B$ of the peripheral portion of the fibrous substrate are measured in the manner described above. As used herein, $T_A$ represents an arithmetic mean value of the thicknesses measured at five different points or more in the center portion, and $T_B$ represents an arithmetic mean value of the thicknesses measured at five different points or more in the peripheral portion.

Whether or not a membrane electrode assembly is within the present invention can be determined as analyzed. An MEA is first disassembled, from which a gas diffusion layer is removed. The same pressure as described above is applied onto the gas diffusion layer, during which the thickness $T_A$ of the center portion and the thickness $T_B$ of the peripheral portion are measured and confirmed. Alternatively, the same pressure as described above is applied to the MEA. While the pressure is applied, the cross section of the MEA is observed by EPMA to measure the thickness $T_A$ of the center portion and the thickness $T_B$ of the peripheral portion of the gas diffusion layer.

The present invention further provides a polymer electrolyte fuel cell comprising the above-described membrane electrode assembly, and a pair of conductive separators, each having a gas flow channel, arranged on both surfaces of the membrane electrode assembly.

Because the polymer electrolyte fuel cell of the present invention comprises the membrane electrode assembly of the present invention, it is possible to protect the polymer electrolyte membrane from damage caused by the asperity of the fibrous substrate of the gas diffusion layer during the clamping of the cell stack, and to prevent the cell output decrease caused by the damage of the polymer electrolyte membrane. Even when the polymer electrolyte fuel cell is operated for a long period of time, it is possible to sufficiently prevent the cell output decrease.

The present invention still further provides a method for producing the above-described membrane electrode assembly, comprising a step of producing the fibrous substrate in which a thickness $T_A$ of a center portion that faces the catalyst layer and a thickness $T_B$ of a peripheral portion surrounding the center portion have a relation represented by the following expression (1):

$$0.7 \leq T_B/T_A \leq 0.9 \tag{1}.$$

According to the method for producing a membrane electrode assembly of the present invention, it is possible to protect the polymer electrolyte membrane from damage caused by the asperity of the fibrous substrate of the gas diffusion layer during the clamping of the cell stack. It is also possible to surely provide a membrane electrode assembly capable of sufficiently preventing the cell output decrease even during long-term operation, and to provide a polymer electrolyte fuel cell comprising the membrane electrode assembly.

Although the present invention is defined by the thicknesses of the center portion and peripheral portion of the gas diffusion layer substrate as described above, there is another way of defining the present invention: the present invention may be defined by repulsive force obtained after compressing the gas diffusion layer to a set thickness. The repulsive force can be measured as follows. The thickness $T_A$ of the center portion of the gas diffusion layer is measured while a pressure of 0.01 MPa is applied to the gas diffusion layer. The gas diffusion layer is then compressed to 75% of that thickness. Thirty seconds after the compression, the repulsive stress of the center portion and that of the peripheral portion are measured.

Effects of the Invention

As described above, according to the present invention, even when the main surface of the fibrous substrate has a larger area than that of the main surface of the catalyst layer, it is possible to protect the polymer electrolyte membrane from damage caused by the asperity of the fibrous substrate during the clamping of the cell stack, and to provide a membrane electrode assembly capable of achieving a highly reliable polymer electrolyte fuel cell in which cell output decrease resulting from the damage is reduced. Moreover, according to the present invention, it is possible to prevent the cell output decrease resulting from the damage of the polymer electrolyte membrane, and to provide a highly reliable polymer electrolyte fuel cell capable of offering stable operation for a long period of time.

BEST MODE FOR CARRYING OUT THE INVENTION

Figure 1:
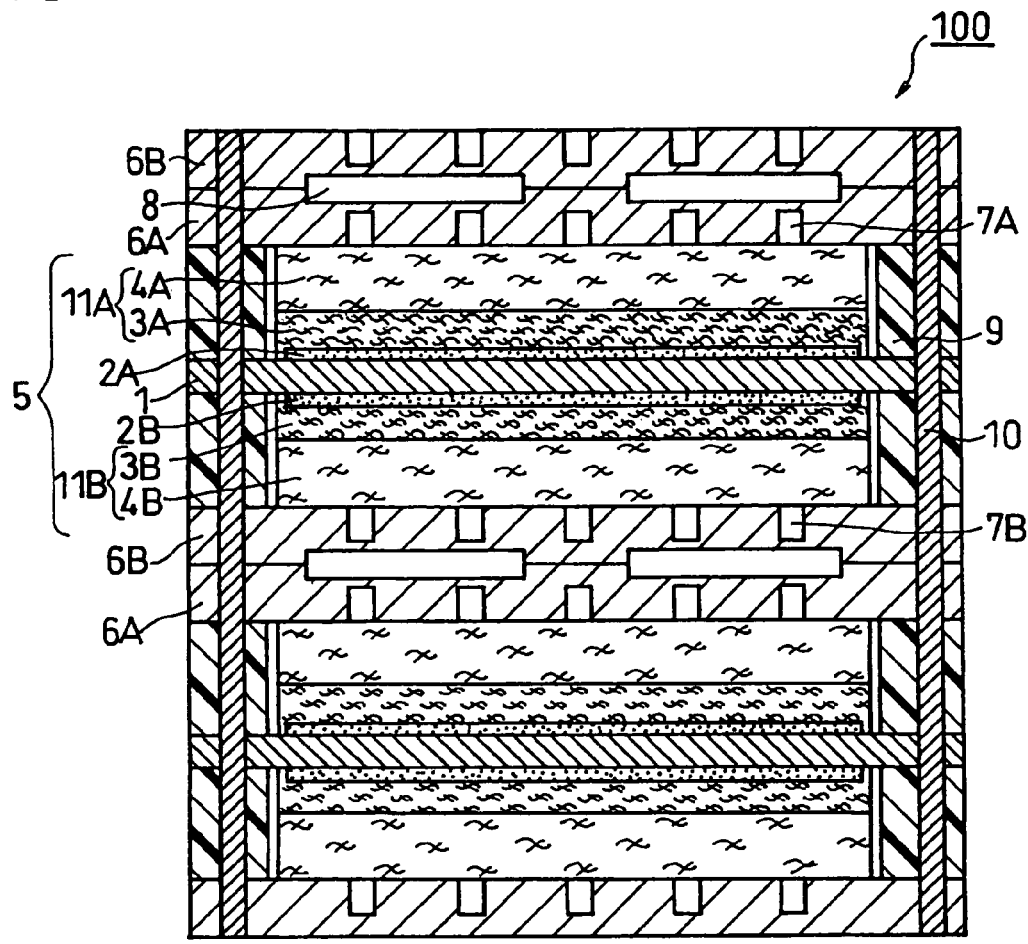
FIG. 1 is a schematic cross sectional view illustrating a structure of an embodiment of a polymer electrolyte fuel cell in accordance with the present invention.

Preferred embodiments of the present invention will be described in detail below with reference to the accompanying drawings. Note that the same reference numerals are given to the same or corresponding parts and some redundant descriptions may be omitted.

First Embodiment

FIG. 1 is a schematic cross sectional view illustrating a structure of an embodiment of a polymer electrolyte fuel cell in accordance with the present invention. In the polymer electrolyte fuel cell 100, on both surfaces of a cation (hydrogen ion) conductive polymer electrolyte membrane 1 are attached catalyst layers 2A and 2B composed mainly of a carbon powder carrying an electrode catalyst (e.g., platinum metal). On the outer surfaces of the catalyst layers 2A and 2B are attached a pair of gas diffusion layers 11A and 11B each comprising a fibrous substrate 4A, 4B and a water repellent carbon layer (covering layer) 3A, 3B.

The water repellent carbon layers 3A and 3B, which have current collecting capability, gas permeability and water repellency, may be formed to enhance water-removing effect, or they may be omitted. In other words, the gas diffusion layers 11A and 11B of the present invention can include only the fibrous substrate 4A, 4B. Alternatively, the gas diffusion layers 11A and 11B of the present invention can include the fibrous substrate 4A, 4B and the water repellent carbon layer 3A, 3B. The fibrous substrates 4A and 4B may be treated for water repellency, which will be described later. By forming the water repellent carbon layer, it is possible to obtain effects such as improved adhesion between the catalyst layer and the gas diffusion layer, reduction of electrical contact resistance, and assured prevention of the fiber, which constitutes the gas diffusion layer, from penetrating the catalyst layer.

The catalyst layer 2A, 2B and the gas diffusion layer 11A, 11B are combined to form gas diffusion electrodes. The polymer electrolyte membrane 1, the catalyst layers 2A and 2B and the gas diffusion layers 11A and 11B are combined to form a membrane electrode assembly (MEA) 5.

In the polymer electrolyte fuel cell of the present invention, conductive separator plates 6A and 6B are inserted between the MEAs 5 so as to mechanically fix the MEA 5 and to electrically connect adjacent MEAs 5 in series to each other. The separator plates 6A and 6B each have a gas flow channel 7A, 7B for supplying fuel gas or oxidant gas to the catalyst layer of fuel electrode or oxidant electrode on one surface thereof and a cooling water flow channel 8 for cooling MEA 5 on the other surface thereof. Further, sealants 9 are arranged to prevent the reaction gas from leaking outside.

In the above-described manner, the MEA 5 and a pair of separator plates 6A and 6B are combined to form a unit cell. A plurality of the unit cells are stacked to form a cell stack. The cell stack is clamped in the stacking direction at a certain clamping pressure with clamping bolts 10 so as to prevent fuel gas or oxidant gas from leaking and to reduce contact resistance in the cell stack. Accordingly, the MEA and the separator plates 6A and 6B are in surface contact with each other at a certain pressure.

The catalyst layers 2A and 2B in the present invention can be formed by a known method practiced in the art using an ink for forming catalyst layer including a dispersion composed of a conductive carbon particle carrying an electrode catalyst comprising noble metal, a cation (hydrogen ion) conductive polymer electrolyte and a dispersing medium. As used herein, "dispersion containing a polymer electrolyte" encompasses, in addition to a liquid in which a polymer electrolyte is dispersed, a liquid in which a part of polymer electrolyte is dissolved and another part is not dissolved but dispersed. The "dispersing medium" may be a liquid capable of dispersing a polymer electrolyte used, a liquid capable of dissolving a polymer electrolyte used, or a liquid capable of dissolving a part of a polymer electrolyte used and dispersing another part of the polymer electrolyte.

The MEA 5 of the polymer electrolyte fuel cell of the present invention can be produced by a known method practiced in the art using the polymer electrolyte membrane 1, the catalyst layers 2A and 2B, and the gas diffusion layers 11A and 11B comprising a fibrous substrate which will be described below.

In order to effectively utilize the reaction area of the catalyst layer and produce high cell output, and to improve assembly efficiency during the assembly of the MEA 5, similar to a conventional MEA, the MEA 5 is configured such that the area of the main surface of the gas diffusion layer 11A, 11B is one size larger than that of the main surface of the catalyst layer 2A, 2B, that the catalyst layer 2A, 2B is placed in the center portion of the gas diffusion layer 11A, 11B, and that the perimeter (peripheral portion) of the gas diffusion layer 11A, 11B is positioned outside the main surface of the catalyst layer 2A, 2B.

Figure 8:
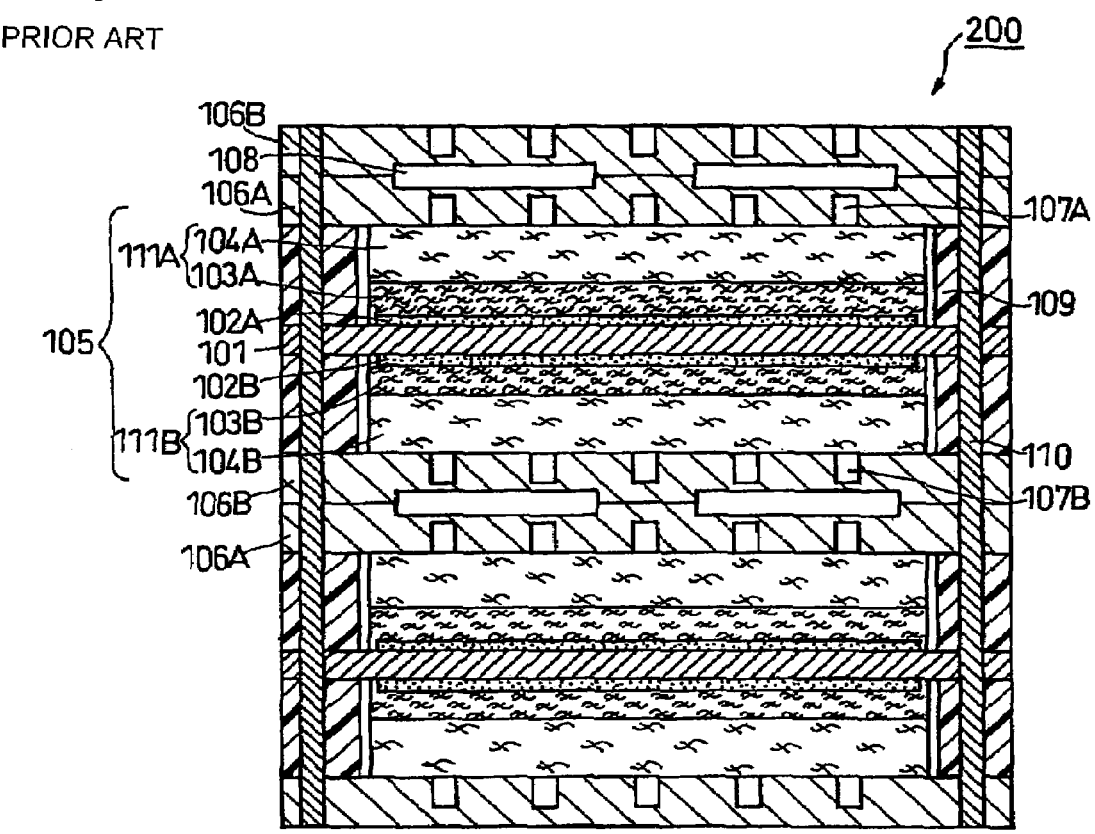
FIG. 8 is a schematic cross sectional view illustrating a structure of an embodiment of a conventional polymer electrolyte fuel cell.

As illustrated above with reference to FIG. 8, in the membrane electrode assembly of a conventional polymer electrolyte fuel cell, the peripheral portion of the gas diffusion layer 111A, 111B is in direct contact with the polymer electrolyte membrane 101. Accordingly, it has the problem that the polymer electrolyte membrane 101 is likely to suffer damage caused by the asperity on the surface of the peripheral portion of the gas diffusion layer 111A, 111B. Furthermore, because the cell stack is clamped in the stacking direction at four points using clamping bolts 110, nuts (not shown) and clamping plates, the pressure applied to the peripheral portion of the gas diffusion layer 111A, 111B is higher than that applied to the center portion, so that the peripheral portion of the gas diffusion layer 111A, 111B contacts the polymer electrolyte membrane 101 directly and more firmly. As a result, the polymer electrolyte membrane 101 is more likely to suffer damage.

In view of the above, the membrane electrode assembly of the present invention is configured such that the main surface of the fibrous substrate of the gas diffusion layer is made larger than the main surface of the catalyst layer, and that a thickness $T_A$ of the center portion that faces the catalyst layer {i.e., the portion on which a projection of the catalyst layer will be positioned if the catalyst layer is projected onto the fibrous substrate in a direction perpendicular to the fibrous substrate surface} and a thickness $T_B$ of the peripheral portion located around the center portion are set to satisfy the following expression (1):

$$0.7 \leq T_B/T_A \leq 0.9 \tag{1}$$

Figure 2:
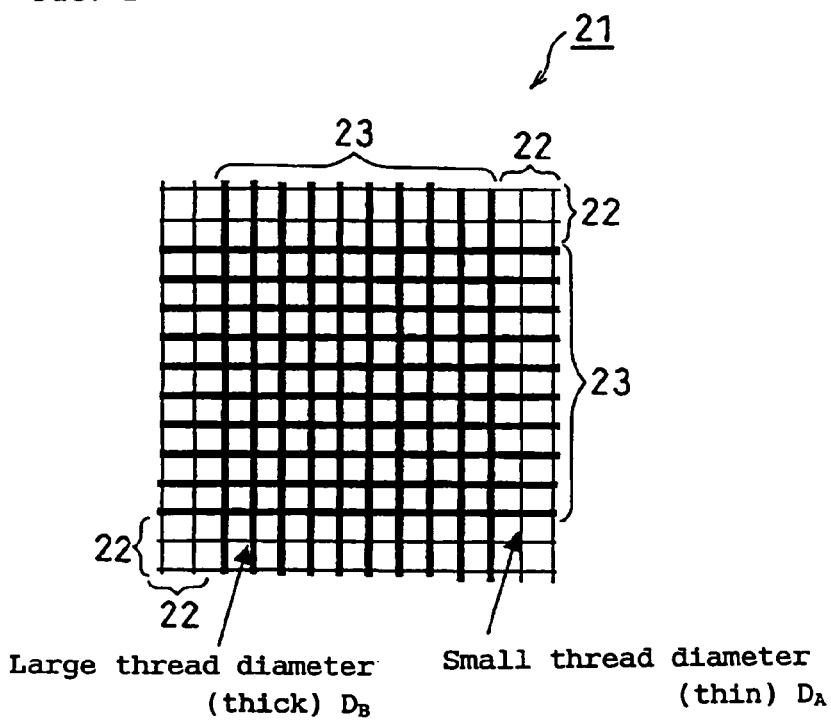
FIG. 2 is a schematic front view of a fibrous substrate 21 according to a first embodiment of the present invention.

The fibrous substrate that satisfies the above expression (1) in the membrane electrode assembly according to the first embodiment of the present invention is described below. FIG. 2 is a schematic front view of a fibrous substrate 21 according to the first embodiment of the present invention. The fibrous substrate 21 in the first embodiment of the present invention comprises a woven fabric, and is characterized in that a thread diameter $D_B$ of the peripheral portion 22 and a thread diameter $D_A$ of the center portion 23 have a relation represented by the following expression (2):

$$D_B < D_A \tag{2}$$

In this fibrous substrate, only the thread diameter $D_B$ of peripheral portion 22 is made small, whereby it is possible to reduce only the thickness of the peripheral portion 22. Accordingly, the stress (repulsive force in a thickness direction) applied to the peripheral portion of the polymer electrolyte membrane during the clamping of the cell stack is reduced, and thus the degradation of the polymer electrolyte membrane can be prevented. In the expression (2), the values of $D_A$ and $D_B$ should be expressed in the same unit.

As the fiber for forming the thread of the woven fabric, i.e., the fibrous substrate of the first embodiment, there can be used polyacrylonitrile (PAN)-based fiber, pitch-based fiber, cellulose-based fiber, polynosic-based fiber or any other known carbon fiber. Particularly preferred is polyacrylonitrile-based fiber because it has high mechanical strength and few impurities. Although filaments of carbon fiber usually have a diameter of 3 to 70 μm, it is particularly preferred to use those having a diameter of 7 to 10 μm.

As the thread for forming the center portion 23 of the fibrous substrate, a stranded thread formed of 10 to 600 filaments of the above-listed fiber twisted together can be used. In this case, by appropriately adjusting the number of the filaments, the stranded thread with desired diameter can be obtained. Alternatively, a double stranded thread formed by twisting two stranded threads together, or a triple stranded thread formed by twisting three stranded threads together can be used. In other words, the thread forming the center portion can be a single stranded thread, double stranded thread or multi stranded thread. Particularly preferred is a double stranded thread because it has higher tensile strength than a single stranded thread.

Likewise, the peripheral portion 22 of the fibrous substrate can be made using a single stranded thread formed by twisting a smaller number of filaments than for the center portion 23, the number being 5 to 500 less than the stranded thread of the center portion 23. Similar to the center portion, a double stranded thread is preferably used to form the peripheral portion.

With the use of the single stranded thread or double stranded thread described above, the woven fabric can be produced using a conventional loom.

Preferred type of weave is plain weave, but it can be twill weave, sateen or any other type of weave. In the production, thicker thread having a larger thread diameter $D_A$ should be used for the center portion 23, and thinner thread having a smaller thread diameter $D_B$ should be used for the peripheral portion 22, whereby a fibrous substrate whose peripheral portion 22 is thinner than the center portion can be formed.

In the case where the threads as described above are woven into a plain weave fabric using a loom, the warp/weft density (the number of warp and weft threads per unit area) is preferably 100 to 500 threads/10 cm², and more preferably 150 to 300 threads/10 cm². If the warp/weft density is too small, thread distortion, unraveling and wrinkling are likely to occur, and the resulting fabric will have low strength. If the warp/weft density is too large, the resulting fabric will be dense, reducing the gas diffusibility and moisture permeability, which affects the cell performance. Moreover, the resulting woven fabric is likely to have a nonuniform thickness.

The woven fabric as described above is then subjected to graphitization process, whereby a fibrous substrate of the present invention can be obtained. For example, the woven fabric as described above is heated at 900° C. in a nitrogen atmosphere for carbonization, and then heated at 2000° C. in an argon atmosphere for graphitization. In such a manner, the fibrous substrate according to the first embodiment of the present invention can be produced.

Second Embodiment

A polymer electrolyte fuel cell according to the second embodiment of the present invention is described here. The polymer electrolyte fuel cell according to the second embodiment of the present invention (not shown in any drawings) is obtained by replacing the fibrous substrates 4A and 4B of the polymer electrolyte fuel cell 100 according to the first embodiment shown in FIG. 1 with those having a different structure. Accordingly, it is identical to the polymer electrolyte fuel cell 100 of the first embodiment except for the structure of the fibrous substrates 4A and 4B.

Figure 3:
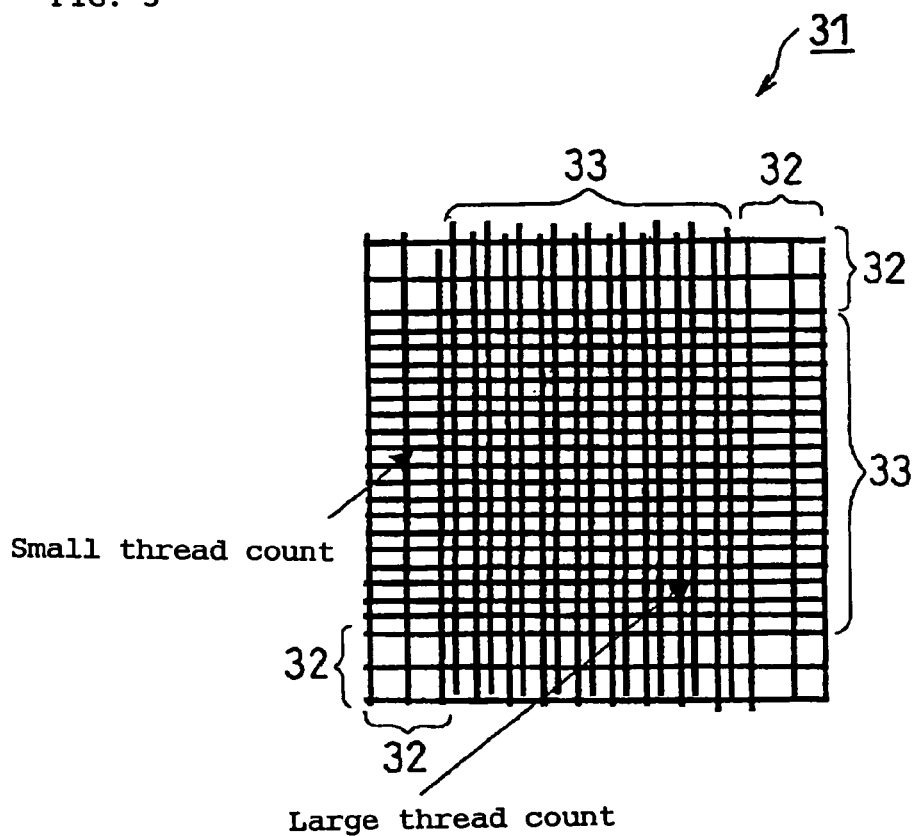
FIG. 3 is a schematic front view of a fibrous substrate 31 according to a second embodiment of the present invention.

The fibrous substrate incorporated in a polymer electrolyte fuel cell according to the second embodiment (a fibrous substrate according to the second embodiment of the present invention) is described below. FIG. 3 is a schematic front view of a fibrous substrate incorporated in the polymer electrolyte fuel cell according to the second embodiment of the present invention.

A fibrous substrate 31 according to the second embodiment of the present invention comprises a woven fabric that satisfies the relation represented by the expression (1) described previously, and is characterized in that a warp and weft thread count $N_B$ per unit area of the peripheral portion 32 and a warp and weft thread count $N_A$ per unit area of the center portion 33 have a relation represented by the following expression (3):

$$N_B < N_A \tag{3}$$

In this fibrous substrate, the warp and weft thread count per unit area of the peripheral portion 32 is smaller than that of the center portion 33, and thus the peripheral portion 32 has a looser structure than the center portion 33. Due to this structure, it is possible to make only the peripheral portion 32 thin when the cell stack is clamped at a certain pressure. As a result, the stress (repulsive force in a thickness direction) applied to the peripheral portion of the polymer electrolyte membrane is reduced, preventing the polymer electrolyte membrane from degrading.

In the expression (3), the values of $N_A$ and $N_B$ should be expressed in the same unit. The unit for the warp and weft thread count per unit area can be, for example, [threads/cm²].

In the fibrous substrate according to the second embodiment can be produced in the same manner using the same materials as for the fibrous substrate in the first embodiment. However, the center portion 33 of the fibrous substrate should have a warp/weft density (a number of warp and weft threads per unit area) of 100 to 500 threads/10 cm², and preferably 150 to 300 threads/10 cm². The warp/weft density of the peripheral portion 32 should be lower by 10 to 200 threads/10 cm² than that of the center portion 33.

The fibrous substrate according to the second embodiment can be produced using, other than the woven fabrics listed above, a non-woven fabric. Non-woven fabric (structure) can be classified into paper and felt according to production methods. For example, carbon paper and carbon felt are used for fuel cells.

The paper can be produced by, for example, immersing carbon fibers into an aqueous solution containing a resin serving as an adhesive (e.g., polyvinyl alcohol) and then scooping up thus immersed carbon fibers (paper manufacturing method, wet method). Whereas the felt can be produced by compressing carbon fibers in the air with a relatively smaller amount of adhesive than in the case of the paper (dry method). However, because the felt contains a smaller amount of resin and is composed of three-dimensionally oriented fibers, fiber unraveling (fuzz) cannot be prevented. Accordingly, a micro short-circuit caused by the penetration of the fiber into the membrane is likely to occur.

Examples of the fibers that form the paper or felt serving as the fibrous substrate according to the second embodiment include, similar to the case of the woven fabric described previously, polyacrylonitrile (PAN)-based fiber, pitch-based fiber, cellulose-based fiber, polynosic-based fiber or any other known carbon fiber. Particularly preferred is polyacrylonitrile-based fiber because it has high mechanical strength and few impurities.

The non-woven fabric (paper, felt) can be produced by binding short fibers of the above-listed carbon fibers according to a conventional method. In this case, the short fibers of the carbon fiber preferably have a fiber diameter of 2 to 25 µm, and more preferably 4 to 15 µm for increasing the strength of the fibrous substrate.

The short fibers preferably have a length of about 2 to 30 mm, and more preferably about 5 to 20 mm for achieving ease of production and increasing the strength of the fibrous substrate.

Figure 4:
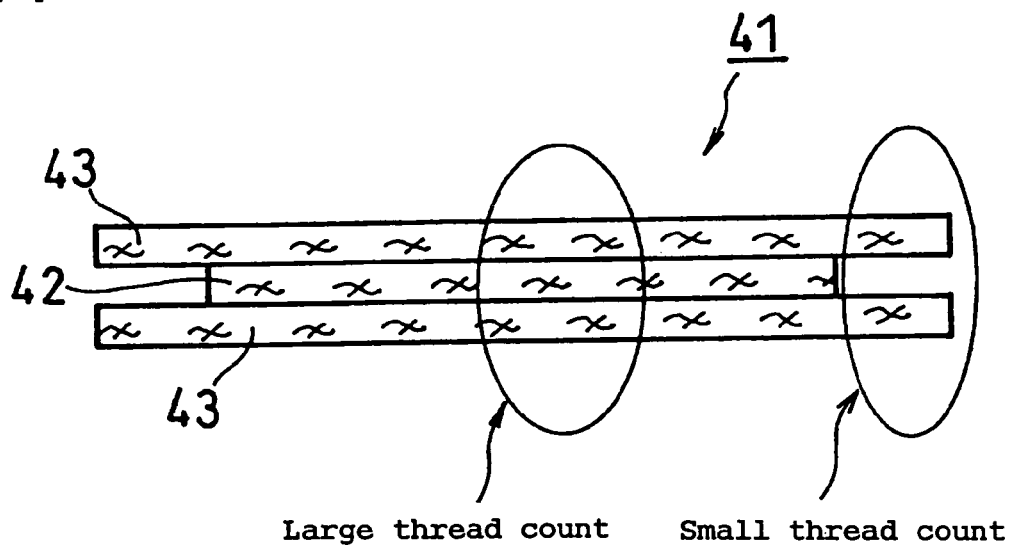
FIG. 4 is a schematic cross sectional view of a fibrous substrate 41 according to a second embodiment of the present invention.

Because the paper produced in the above-described manner alone is thin and lacks sufficient strength, a laminate obtained by bonding a plurality of the papers can be used as a fibrous substrate according to the second embodiment of the present invention. For example, as shown in FIG. 4, a laminate 41 obtained by sandwiching a paper 42 having the same area as the main surface of the catalyst layer between two papers 43 having a larger area than the paper 42 can be used as the fibrous substrate. FIG. 4 is a schematic cross sectional view of a fibrous substrate comprising the papers according to the second embodiment of the present invention.

The paper 42 and the papers 43 can be bonded with, for example, polyvinyl alcohol, a thermoplastic resin such as polyester, or a thermosetting resin such as phenol resin, epoxy resin, furan resin, melamine resin or pitch.

Third Embodiment

A polymer electrolyte fuel cell according to the third embodiment of the present invention is described here. The polymer electrolyte fuel cell according to the third embodiment of the present invention (not shown in any drawings) is obtained by replacing the fibrous substrates 4A and 4B of the polymer electrolyte fuel cell 100 according to the first embodiment shown in FIG. 1 with those having a different structure. Accordingly, it is identical to the polymer electrolyte fuel cell 100 of the first embodiment except for the structure of the fibrous substrates 4A and 4B.

Figure 5:
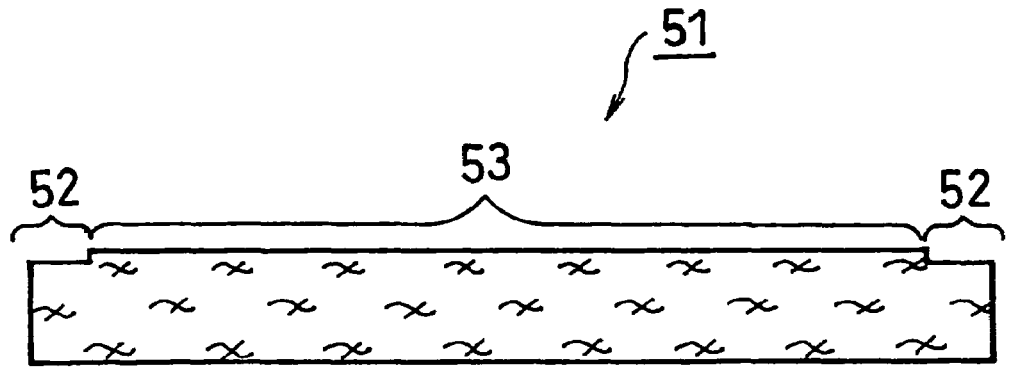
FIG. 5 is a schematic cross sectional view of a fibrous substrate 51 according to a third embodiment of the present invention.

The fibrous substrate incorporated in the polymer electrolyte fuel cell according to the third embodiment (a fibrous substrate according to the third embodiment of the present invention) is described below. FIG. 5 is a schematic cross sectional view of a fibrous substrate incorporated in the polymer electrolyte fuel cell according to the third embodiment of the present invention.

A fibrous substrate 51 according to the third embodiment of the present invention may comprise either a woven fabric or paper as long as the relation represented by the expression (1) described previously is satisfied, and is characterized in that the peripheral portion 52 is pressed.

Because only the peripheral portion 52 of this fibrous substrate is made thinner than the center portion 53 by pressing, the stress (repulsive force in a thickness direction) applied to the peripheral portion 52 will also be small when the cell stack is clamped at a certain pressure. Accordingly, it is possible to reduce mechanical damage to the peripheral portion of the polymer electrolyte membrane caused during the clamping of the cell stack. As a result, the degradation of the polymer electrolyte membrane can be prevented.

Examples of the method of pressing include oil hydraulic pressing, hot pressing and roll pressing at room temperature. The pressing pressure is preferably higher than the clamping pressure during power generation. Specifically, preferred is a pressure of not less than 20 kg/cm² and not greater than 1000 kg/cm². When the pressure is not less than 20 kg/cm², the effects of the present invention can be obtained sufficiently. When the pressure is not greater than 1000 kg/cm², the fibrous substrate will not be broken. As a pressing means, any pressing machine can be used as long as pressing can be performed at a temperature ranging from room temperature to not greater than 1000° C.

The pressing can be performed either before or after the carbonization and graphitization in which the woven fabric or paper is baked. Alternatively, the pressing may be performed between the carbonization and the graphitization.

Fourth Embodiment

A polymer electrolyte fuel cell according to the fourth embodiment of the present invention is described here. The polymer electrolyte fuel cell according to the fourth embodiment of the present invention (not shown in any drawings) is obtained by replacing the fibrous substrates 4A and 4B of the polymer electrolyte fuel cell 100 according to the first embodiment shown in FIG. 1 with those having a different structure. Accordingly, it is identical to the polymer electrolyte fuel cell 100 of the first embodiment except for the structure of the fibrous substrates 4A and 4B.

Figure 6:
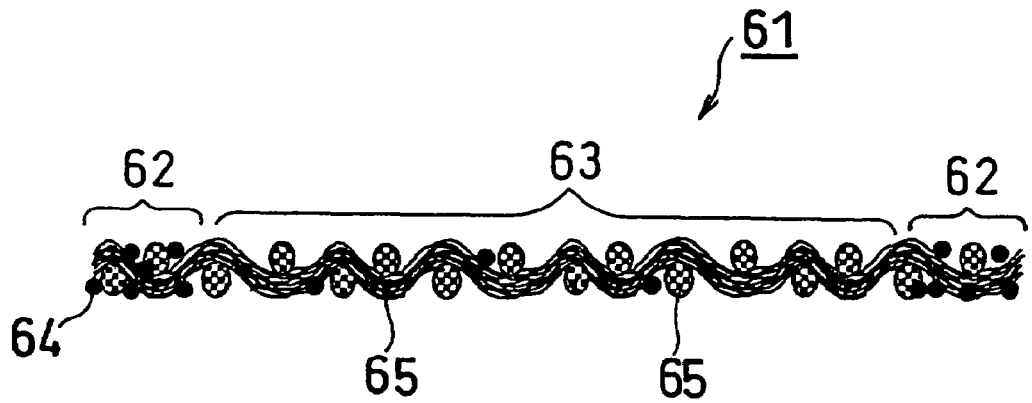
FIG. 6 is a schematic cross sectional view of a fibrous substrate 61 according to a fourth embodiment of the present invention.

The fibrous substrate incorporated in the polymer electrolyte fuel cell according to the fourth embodiment (a fibrous substrate according to the fourth embodiment of the present invention) is described below. FIG. 6 is a schematic cross sectional view of a fibrous substrate incorporated in the polymer electrolyte fuel cell according to the fourth embodiment of the present invention.

A fibrous substrate 61 according to the fourth embodiment of the present invention is preferably based on the fibrous substrate according to the third embodiment. The fibrous substrate 61 may comprise either a woven fabric or paper as long as the relation represented by the expression (1) described previously is satisfied, and is characterized in that the fibrous substrate 61 further comprise a water repellent 64, and a water repellent concentration $H_B$ of the peripheral portion 62 and a water repellent concentration $H_A$ of the center portion 63 have a relation represented by the following expression (4):

$$H_B > H_A \tag{4}$$

In this fibrous substrate, a larger amount of the water repellent 64 is added to the peripheral portion of the substrate in a certain manner, which is then pressed. Thereby, the resin particles of the water repellent are heat-fused and adhered to the spaces between threads 65 made of carbon fiber. The larger the amount of the water repellent 64 that are heat-fused, the more likely the thin thickness and shape obtained by the pressing is maintained in the resulting membrane electrode assembly when a clamping pressure is applied to the cell stack. Accordingly, it is possible to protect the polymer electrolyte membrane from mechanical damage.

In the expression (4), the values of $H_A$ and $H_B$ should be expressed in the same unit.

The water repellent 64 is preferably a fluorocarbon resin from the viewpoint of chemical stability. Among fluorocarbon resins, polytetrafluoroethylene (PTFE) or a tetrafluoroethylene-hexafluoropropylene copolymer (FEP) is particularly preferred because they have superior durability, heat resistance and weather resistance.

The amount of the water repellent 64 is preferably adjusted such that the content of the water repellent 64 in the center portion 63 of the fibrous substrate after the application of the water repellent and the drying of the substrate is 5 to 30 wt %. When the content of the water repellent 64 is less than 5 wt %, sufficient water repellency cannot be imparted to the resulting gas diffusion layer. When the content of the water repellent 64 exceeds 30 wt %, the resulting gas diffusion layer will have a low porosity and low gas diffusibility. As a result, the diffusion rate of reaction gas is limited, and the voltage becomes low.

In the production of the fibrous substrate according to the fourth embodiment of the present invention, the entire fibrous substrate is first treated for water repellency, after which only the peripheral portion 62 of the fibrous substrate is further treated for water repellency so as to add the water repellent 64 by 3 to 15 wt % more. The method for adding the water repellent 64 is not specifically limited as long as the fibrous substrate can be sufficiently impregnated with a water repellent treatment liquid, and those skilled in the art can select an appropriate method.

Although the embodiments of the present invention have been described above, it should be understood that the present invention is not limited to the embodiments given above.

Moreover, in the fibrous substrates according to the first to fourth embodiments of the present invention, it is preferred that a variation (difference between the maximum and minimum values) of the thickness $T_B$ of the peripheral portion 22, 32, 42, 52, 62 be not greater than 10 µm. When the difference between the maximum and minimum values is not greater than 10 µm, the asperity on the surface of the peripheral portion 22, 32, 42, 52, 62 is not remarkable. Accordingly, the clamping pressure can be applied uniformly to the entire polymer electrolyte membrane during the clamping of the cell stack, and therefore it is less likely to cause mechanical damage to the polymer electrolyte membrane.

EXAMPLE

The present invention will be described in detail below with reference to examples. However, it should be understood that the present invention is not limited thereto.

Example 1

In this example, a polymer electrolyte fuel cell according to the first embodiment of the present invention having a structure as shown in FIG. 1 was produced. A fibrous substrate (woven fabric) according to the first embodiment of the present invention as shown in FIG. 2 was first produced using a polyacrylonitrile-based carbon fiber (Torayca T300 (trade name) manufactured by Toray Industries. Inc., with a diameter of 7 µm) as the filament.

The thread for use in the center portion 23 of the fibrous substrate was a double stranded thread formed by twisting two stranded threads together, each stranded thread formed by twisting 300 filaments. The thread for use in the peripheral portion 22 (the area to which the polymer electrolyte membrane and the gas diffusion layer would come in direct contact) was a double stranded thread formed by twisting two stranded threads together, each stranded thread formed by twisting 150 filaments. Using these two types of double stranded threads, a plain woven fabric was produced using a conventional loom. The warp/weft density was set to 200 threads/10 cm$^2$.

The obtained woven fabric was then heated at 900° C. in a nitrogen atmosphere for carbonization, and then heated at 2000° C. in an argon atmosphere for graphitization. Thereby, a fibrous substrate of the present invention was produced. A thickness $T_A$ of the center portion and a thickness $T_B$ of the peripheral portion of the obtained fibrous substrate were measured according to JIS L 1096 (Testing Method for Woven Fabrics) described previously. Table 1 shows the ratio $T_B/T_A$ between thickness $T_A$ of the center portion and thickness $T_B$ of the peripheral portion, and the variation (difference between the maximum and minimum values) of the thickness $T_B$.

A water repellent carbon layer containing conductive particles was then formed on the fibrous substrate produced above to obtain a gas diffusion layer. The water repellent carbon layer containing conductive particles was formed by applying, on the fibrous substrate by a doctor blade, a carbon ink prepared by mixing acetylene black, water, polytetrafluoroethylene (PTFE) and a surfactant (TritonX-100) at a weight ratio of 15:80:4:1, followed by baking at 325° C. for one hour. Thereby, a gas diffusion layer was produced.

Using the gas diffusion layer, a unit cell was constructed in the following procedure. The unit cell was then subjected to a cell operation test to check cycle life characteristic. A catalyst (25 wt % of Pt) comprising an acetylene black carbon powder carrying a platinum particle having an average particle size of about 30 angstrom was used as the electrode catalyst. This electrode catalyst was dispersed in isopropanol to yield a dispersion, with which another dispersion prepared by dispersing a powder of perfluorocarbon sulfonic acid in ethyl alcohol was mixed. Thereby, an ink for forming catalyst layer in the form of a paste was prepared.

The ink for forming catalyst layer was applied to both surfaces of a polymer electrolyte membrane (Gore-Select membrane manufactured by Japan Gore-Tex Inc., with a thickness of 30 µm) using screen printing method to form catalyst layers. The amounts of platinum and perfluorocarbon sulfonic acid were adjusted such that the amount of platinum was 0.5 mg/cm$^2$ and the amount of perfluorocarbon sulfonic acid was 1.2 mg/cm$^2$ in the formed catalyst layer.

Subsequently, on each surface of the polymer electrolyte membrane to which the catalyst layer was applied was arranged the gas diffusion layer produced above such that the water repellent carbon layer was in contact with the polymer electrolyte membrane, which was then bonded by hot pressing. Thereby, a membrane electrode assembly was produced.

Gaskets made of silicone resin were arranged on the perimeters of the electrodes, each comprising the gas diffusion layer and the catalyst layer, in the MEA, so as to seal fuel gas or oxidant gas. Then, on both surfaces of the MEA were arranged a pair of conductive separator plates for connecting adjacent MEAs to each other in series, having a gas flow channel for supplying a reaction gas to an electrode and exhausting water or excess gas generated by the reaction. They were clamped at a pressure of 10 kgf/cm². Thereby, a polymer electrolyte fuel cell of the present invention comprising a single unit cell was produced.

Figure 7:
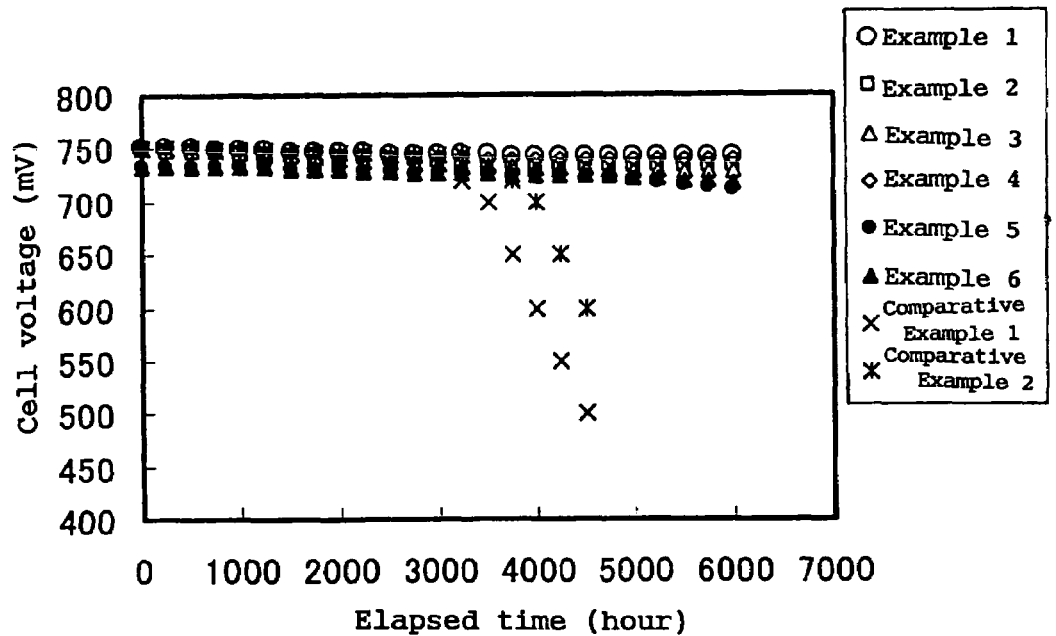
FIG. 7 is a graph showing relation between elapsed time after the start of operation and cell voltage for polymer electrolyte fuel cells of the present invention and comparative examples.

The obtained polymer electrolyte fuel cell was operated under conditions in which fully humidified hydrogen and air were supplied to the fuel electrode and the oxidant electrode, respectively. More specifically, the cell temperature was maintained at 80° C. A hydrogen gas was humidified to have a dew point of 80° C. Air was also humidified to have a dew point of 80° C. The cell was then operated with a fuel utilization rate of 80%, air utilization rate of 50% and a current density of 0.35 A/cm². FIG. 7 shows relation between elapsed time and cell voltage.

The gas diffusion layer produced in this example was analyzed by the method described previously for repulsive stress of the center portion and that of the peripheral portion. As a result, the stress of the center portion was 0.8 MPa, whereas the stress of the peripheral portion was 0.1 MPa. Accordingly, it can be concluded that the stress of the center portion is larger so that it is likely to cause mechanical damage to the catalyst layer and the polymer electrolyte membrane, whereas the peripheral portion does not suffer from such concerns, and the effects of the present is achieved.

Example 2

In this example, a polymer electrolyte fuel cell according to the second embodiment of the present invention having a structure as shown in FIG. 1 was produced. Specifically, a polymer electrolyte fuel cell of the present invention was produced in the same manner as in Example 1 except that a fibrous substrate (woven fabric) according to the second embodiment of the present invention as shown in FIG. 3, which was produced using a polyacrylonitrile-based carbon fiber (Torayca T300 (trade name) manufactured by Toray Industries. Inc., with a diameter of 7 µm) as the filament, was used.

As the thread for use in the center portion 33 of the fibrous substrate, a double stranded thread formed by twisting two stranded threads together, each stranded thread formed by twisting 300 filaments was used. Using this double stranded thread, a plain woven fabric was produced using a conventional loom. In the production of the plain woven fabric, different warp and weft thread counts were used for the peripheral portion 32 and the center portion 33. The warp/weft density of the center portion 33 was set to 200 threads/10 cm², and the warp/weft density of the peripheral portion 32 was set to 120 threads/10 cm².

The woven fabric was then heated at 900° C. in a nitrogen atmosphere for carbonization, and then heated at 2000° C. in an argon atmosphere for graphitization. Thereby, a fibrous substrate according to the second embodiment of the present invention was produced. The ratio $T_B/T_A$ between thickness $T_A$ of the center portion and thickness $T_B$ of the peripheral portion, and the variation (difference between the maximum and minimum values) of the thickness $T_B$ were measured in the same manner as in Example 1, the result of which is shown in Table 1. Further, using the fibrous substrate, a polymer electrolyte fuel cell comprising a single unit cell was produced in the same manner as in Example 1. The fuel cell was then subjected to the cell test. The result of the cell test is shown in FIG. 7.

The gas diffusion layer produced in this example was analyzed for repulsive stress of the center portion and that of the peripheral portion in the same manner as in Example 1. As a result, the stress of the center portion was 0.8 MPa, whereas the stress of the peripheral portion was 0.06 MPa.

Example 3

In this example, a polymer electrolyte fuel cell according to the second embodiment of the present invention having a structure as shown in FIG. 1 was produced. Specifically, a polymer electrolyte fuel cell of the present invention was produced in the same manner as in Example 1 except that a fibrous substrate (paper) according to the second embodiment of the present invention as shown in FIGS. 3 and 4, which was produced using a polyacrylonitrile carbon fiber (Torayca T300 (trade name) manufactured by Toray Industries. Inc., with a diameter of 7 µm) as the filament, was used.

The above-mentioned filament was cut into a length of 20 mm to give short fibers. By paper manufacturing method, the short fibers were then produced into three thin papers. One out of the three was cut into a 5 cm square, that is, one size smaller than the main surface of the catalyst layer. The other two were cut into a 6 cm square, that is, the same size as the catalyst layer. The 5 cm square paper was sandwiched between the two 6 cm square papers such that the 5 cm square paper was placed in the center of the two 6 cm square papers and a perimeter having a width of 1 cm was formed. A phenol resin was applied between the papers, which was then pressed by a pressing machine at a pressure of 15 kg/cm² at room temperature. Thereby, a paper laminate was obtained.

This paper laminate was then heated at 900° C. in a nitrogen atmosphere for carbonization, and then heated at 2000° C. in an argon atmosphere for graphitization. Thereby, a fibrous substrate according to the second embodiment of the present invention was produced. The ratio $T_B/T_A$ between thickness $T_A$ of the center portion and thickness $T_B$ of the peripheral portion, and the variation (difference between the maximum and minimum values) of the thickness $T_B$ were measured in the same manner as in Example 1, the result of which is shown in Table 1. Further, using the fibrous substrate, a polymer electrolyte fuel cell comprising a single unit cell was produced in the same manner as in Example 1. The fuel cell was then subjected to the cell test. The result of the cell test is shown in FIG. 7.

The gas diffusion layer produced in this example was analyzed for repulsive stress of the center portion and that of the peripheral portion in the same manner as in Example 1. As a result, the stress of the center portion was 0.8 MPa, whereas the stress of the peripheral portion was 0.08 MPa.

Example 4

In this example, a polymer electrolyte fuel cell according to the third embodiment of the present invention having a structure as shown in FIG. 1 was produced. Specifically, a polymer electrolyte fuel cell of the present invention was produced in the same manner as in Example 1 except that a fibrous substrate according to the third embodiment of the present invention as shown in FIG. 5, which was produced using a commercially available paper (TGP-H-120 manufactured by Toray Industries. Inc., a 6 cm square paper with a thickness of 360 µm), was used.

The paper was then heated at 900° C. in a nitrogen atmosphere for carbonization, and then heated at 2000° C. in an argon atmosphere for graphitization. Thereafter, the peripheral portion 52 (with a width of 5 mm) was oil hydraulically pressed at a pressure of 100 kg/cm² at room temperature. Thereby, a fibrous substrate according to the third embodiment of the present invention was produced. The ratio $T_B/T_A$ between thickness $T_A$ of the center portion and thickness $T_B$ of the peripheral portion, and the variation (difference between the maximum and minimum values) of the thickness $T_B$ were measured in the same manner as in Example 1, the result of which is shown in Table 1. Further, using the fibrous substrate, a polymer electrolyte fuel cell comprising a single unit cell was produced in the same manner as in Example 1. The fuel cell was then subjected to the cell test. The result of the cell test is shown in FIG. 7.

The gas diffusion layer produced in this example was analyzed for repulsive stress of the center portion and that of the peripheral portion in the same manner as in Example 1. As a result, the stress of the center portion was 0.8 MPa, whereas the stress of the peripheral portion was 0.06 MPa.

Example 5

In this example, a polymer electrolyte fuel cell according to the fourth embodiment of the present invention having a structure as shown in FIG. 1 was produced. Specifically, a polymer electrolyte fuel cell of the present invention was produced in the same manner as in Example 1 except that a fibrous substrate according to the fourth embodiment of the present invention as shown in FIG. 6, which was produced using a commercially available woven fabric (GF-20-31E manufactured by Nippon Carbon Co., Ltd.), was used.

A first water repellent treatment liquid was prepared by mixing an aqueous dispersion containing polytetrafluoroethylene (PTFE) (D-1 manufactured by Daikin Industries, Ltd.) and water at a volume ratio of 1:20. The woven fabric was immersed in the first water repellent treatment liquid at room temperature in an atmosphere for one minute. After one minute, the woven fabric was taken out from the liquid, which was then baked at 270° C. for two hours to remove water and surfactant. The amount of the water repellent in the woven fabric having subjected to the first water repellent treatment was calculated based on the weight of the woven fabric before the immersion and that after the immersion. It was found that the amount of the water repellent added was equal to 10 wt % of the woven fabric before the first water repellent treatment.

Subsequently, the peripheral portion 62 of the woven fabric having subjected to the first water repellent treatment was subjected to another water repellent treatment (second water repellent treatment). A second water repellent treatment liquid was prepared by mixing an aqueous dispersion containing polytetrafluoroethylene (PTFE) (D-1 manufactured by Daikin Industries, Ltd.) and water at a volume ratio of 1:10. Only the peripheral portion 62 was immersed in the second water repellent treatment liquid at room temperature in an atmosphere for one minute. After one minute, the woven fabric was taken out from the liquid, which was then baked at 350° C. for two hours to remove water and surfactant.

The amount of the water repellent in the peripheral portion 62 of the woven fabric having subjected to the second water repellent treatment was calculated based on the weight of the woven fabric before the immersion and that after the immersion. It was found that the amount of the water repellent added was equal to 5 wt % of the woven fabric before the second water repellent treatment. In other words, the water repellent was added to the peripheral portion 62 in an amount equal to 15 wt % of the peripheral portion before the first and second water repellent treatments.

After the water repellent treatments, the woven fabric was pressed. In the pressing, the peripheral portion 62 (with a width of 5 mm) was hydraulically pressed at a pressure of 50 kg/cm² at room temperature. Thereby, a fibrous substrate according to the fourth embodiment of the present invention was produced.

The ratio $T_B/T_A$ between thickness $T_A$ of the center portion and thickness $T_B$ of the peripheral portion, and the variation (difference between the maximum and minimum values) of the thickness $T_B$ were measured in the same manner as in Example 1, the result of which is shown in Table 1. Further, using the fibrous substrate, a polymer electrolyte fuel cell comprising a single unit cell was produced in the same manner as in Example 1. The fuel cell was then subjected to the cell test. The result of the cell test is shown in FIG. 7.

The gas diffusion layer produced in this example was analyzed for repulsive stress of the center portion and that of the peripheral portion in the same manner as in Example 1. As a result, the stress of the center portion was 0.8 MPa, whereas the stress of the peripheral portion was 0.15 MPa.

Example 6

In this example, a polymer electrolyte fuel cell according to the fourth embodiment of the present invention having a structure as shown in FIG. 1 was produced. Specifically, a polymer electrolyte fuel cell of the present invention was produced in the same manner as in Example 1 except that a fibrous substrate according to the fourth embodiment of the present invention, which was produced using a commercially available paper (TGP-H-120 manufactured by Toray Industries. Inc., a 6 cm square paper with a thickness of 360 μm), was used.

A first water repellent treatment liquid was first prepared in the same manner as in Example 5. The above-mentioned paper was immersed in the first water repellent treatment liquid at room temperature in an atmosphere for one minute. After one minute, the paper was taken out from the liquid, which was then baked at 350° C. for three hours to remove water and surfactant. The amount of the water repellent in the paper having subjected to the first water repellent treatment was calculated based on the weight of the woven fabric before the immersion and that after the immersion. It was found that the amount of the water repellent added was equal to 12 wt % of the paper before the first water repellent treatment.

Subsequently, the peripheral portion 62 of the paper having subjected to the first water repellent treatment was subjected to another water repellent treatment (second water repellent treatment) in the same manner as in Example 5. Thereby, a fibrous substrate of the present invention was produced.

The amount of the water repellent in the peripheral portion 62 of the paper having subjected to the second water repellent treatment was calculated based on the weight of the paper before the immersion. It was found that the amount of the water repellent added was equal to 6 wt % of the paper before the second water repellent treatment. In other words, the water repellent was added to the peripheral portion 62 in an amount equal to 18 wt % of the peripheral portion before the first and second water repellent treatments.

After the water repellent treatments, the paper was pressed. In the pressing, the peripheral portion 62 (with a width of 5 mm) was oil hydraulically pressed at a pressure of 50 kg/cm² at room temperature. Thereby, a fibrous substrate according to the fourth embodiment of the present invention was produced.

The ratio $T_B/T_A$ between thickness $T_A$ of the center portion and thickness $T_B$ of the peripheral portion, and the variation (difference between the maximum and minimum values) of the thickness $T_B$ were measured in the same manner as in Example 1, the result of which is shown in Table 1. Further, using the fibrous substrate, a polymer electrolyte fuel cell comprising a single unit cell was produced in the same manner as in Example 1. The fuel cell was then subjected to the cell test. The result of the cell test is shown in FIG. 7.

The gas diffusion layer produced in this example was analyzed for repulsive stress of the center portion and that of the peripheral portion in the same manner as in Example 1. As a result, the stress of the center portion was 0.8 MPa, whereas the stress of the peripheral portion was 0.1 MPa.

Comparative Example 1

In this comparative example, a commercially available paper (TGP-H-120 manufactured by Toray Industries. Inc., with a thickness of 360 µm) was used as the fibrous substrate. The ratio between thickness of the center portion and thickness of the peripheral portion, and the variation (difference between the maximum and minimum values) of the thickness were measured in the same manner as in Example 1, the result of which is shown in Table 1. Further, a polymer electrolyte fuel cell comprising a single unit cell was produced in the same manner as in Example 1 except that the above-described fibrous substrate was used. The fuel cell was then subjected to the cell test. The result of the cell test is shown in FIG. 7.

The gas diffusion layer produced in this comparative example was analyzed for repulsive stress of the center portion and that of the peripheral portion in the same manner as in Example 1. As a result, the stress of the center portion was 0.8 MPa, whereas the stress of the peripheral portion was 0.7 MPa.

Comparative Example 2

In this comparative example, a commercially available woven fabric (GF-20-31E manufactured by Nippon Carbon Co., Ltd.) was immersed in a water repellent treatment liquid prepared by mixing an aqueous dispersion containing polytetrafluoroethylene (PTFE) (D-1 manufactured by Daikin Industries, Ltd.) and water at a volume ratio of 1:20 at room temperature in an atmosphere for one minute. After one minute, the immersed woven fabric was taken out from the liquid, which was then baked at 270° C. for two hours to remove water and surfactant.

The amount of the water repellent in the entire woven fabric after the water repellent treatment was calculated based on the weight of the woven fabric before the immersion and that after the immersion. It was found that the amount of the water repellent added was equal to 10 wt % of the woven fabric before the water repellent treatment.

The ratio between thickness of the center portion and thickness of the peripheral portion, and the variation (difference between the maximum and minimum values) of the thickness were measured in the same manner as in Example 1, the result of which is shown in Table 1. Further, a polymer electrolyte fuel cell comprising a single unit cell was produced in the same manner as in Example 1 except that the above-described fibrous substrate was used. The fuel cell was then subjected to the cell test. The result of the cell test is shown in FIG. 7.

The gas diffusion layer produced in this example was analyzed for repulsive stress of the center portion and that of the peripheral portion in the same manner as in Example 1. As a result, the stress of the center portion was 0.8 MPa, whereas the stress of the peripheral portion was 0.7 MPa.

Comparative Example 3

Only the peripheral portion (with a width of 5 mm) of a commercially available paper (TGP-H-120 manufactured by Toray Industries. Inc., a 6 cm square paper with a thickness of 360 µm) was hydraulically pressed at room temperature. The pressing pressure was set to 50 kg/cm². The paper had already been carbonized and graphitized before the pressing.

The ratio between thickness of the center portion and thickness of the peripheral portion, and the variation (difference between the maximum and minimum values) of the thickness were measured in the same manner as in Example 1, the result of which is shown in Table 1. Further, a polymer electrolyte fuel cell comprising a single unit cell was produced in the same manner as in Example 1 except that the above-described fibrous substrate was used. The fuel cell was then subjected to the cell test. The result of the cell test is shown in FIG. 7.

TABLE 1

|  | Ratio $T_B/T_A$ between thickness $T_A$ of center portion and thickness $T_B$ of peripheral portion | Thickness variation 1: a variation of not greater than 10 µm 2: a variation of greater than 10 µm |
|---|---|---|
| Ex. 1 | 0.85 | 2 |
| Ex. 2 | 0.74 | 2 |
| Ex. 3 | 0.81 | 2 |
| Ex. 4 | 0.71 | 2 |
| Ex. 5 | 0.89 | 1 |
| Ex. 6 | 0.82 | 1 |
| Comp. Ex. 1 | 1.00 | 2 |
| Comp. Ex. 2 | 1.01 | 1 |
| Comp. Ex. 3 | 0.68 | 2 |

Table 1 and FIG. 1 prove that, according to the present invention, even when the main surface of the fibrous substrate is larger than the main surface of the catalyst layer, it is possible to prevent the asperity of the fibrous substrate from causing damage to the polymer electrolyte during the clamping of the cell stack by adjusting the thicknesses of the center portion and peripheral portion of the fibrous substrate, and to easily and certainly provide a highly reliable polymer electrolyte fuel cell in which cell output decrease resulting from the damage can be reduced.

INDUSTRIAL APPLICABILITY

The membrane electrode assembly of the present invention is suitable for use in polymer electrolyte fuel cells as well as various fuel cells such as liquid fuel cells and phosphoric acid fuel cells. The membrane electrode assembly of the present invention is also applicable to gas generators and gas purifiers for oxygen gas, ozone gas and hydrogen gas, as well as various gas sensors such as oxygen sensors and alcohol sensors. Further, the membrane electrode assembly of the present invention is particularly suitable for use in polymer electrolyte fuel cells for stationary, automotive and mobile applications.

The invention claimed is:

1. A membrane electrode assembly comprising a hydrogen ion conductive polymer electrolyte membrane, a pair of catalyst layers arranged on both surfaces of said polymer electrolyte membrane, and a pair of gas diffusion layers, each comprising a fibrous substrate, arranged on the outer surfaces of said catalyst layers, characterized in that, a main surface of said fibrous substrate has a larger area than a main surface of said catalyst layer, said fibrous substrate has a center portion that faces said catalyst layer and a peripheral portion surrounding said center portion, and in said fibrous substrate, a thickness $T_A$ of said center portion and a thickness $T_B$ of said peripheral portion have a relation represented by the following expression (1):

$$0.7 \leq T_B/T_A \leq 0.9 \quad (1).$$

2. The membrane electrode assembly in accordance with claim 1, characterized in that, in said fibrous substrate, a thread diameter $D_A$ of said center portion and a thread diameter $D_B$ of said peripheral portion have a relation represented by the following expression (2):

$$D_B < D_A \quad (2).$$

3. The membrane electrode assembly in accordance with claim 1, characterized in that, in said fibrous substrate, a warp and weft thread count $N_B$ per unit area of said peripheral portion and a warp and weft thread count $N_A$ per unit area of said center portion have a relation represented by the following expression (3):

$$N_B < N_A \quad (3).$$

4. The membrane electrode assembly in accordance with claim 1, characterized in that, in said fibrous substrate, said peripheral portion is pressed.

5. The membrane electrode assembly in accordance with claim 1, characterized in that, said fibrous substrate comprises a water repellent, and a water repellent concentration $H_B$ of said peripheral portion and a water repellent concentration $H_A$ of said center portion have a relation represented by the following expression (4):

$$H_B > H_A \quad (4).$$

6. The membrane electrode assembly in accordance with claim 1, characterized in that, a variation of the thickness $T_A$ of said peripheral portion is not greater than 10 μm.

7. The membrane electrode assembly in accordance with claim 1, characterized in that, said gas diffusion layer has a water repellent carbon layer on a main surface of said fibrous substrate at the catalyst layer side.

8. A polymer electrolyte fuel cell comprising the membrane electrode assembly in accordance with claim 1, and a pair of conductive separators, each having a gas flow channel, arranged on both surfaces of said membrane electrode assembly.

9. A method for producing a membrane electrode assembly comprising a hydrogen ion conductive polymer electrolyte membrane, a pair of catalyst layers arranged on both surfaces of said polymer electrolyte membrane, and a pair of gas diffusion layers, each comprising a fibrous substrate, arranged on the outer surfaces of said catalyst layers, said method comprising a step of producing said fibrous substrate such that a main surface of said fibrous substrate has a larger area than a main surface of said catalyst layer, that said fibrous substrate has a center portion that faces said catalyst layer and a peripheral portion surrounding said center portion, that a thickness $T_A$ of said center portion and a thickness $T_B$ of said peripheral portion have a relation represented by the following expression (1), and that a thread diameter $D_A$ of said center portion and a thread diameter $D_B$ of said peripheral portion have a relation represented by the following expression (2):

$$0.7 \leq T_B/T_A \leq 0.9 \quad (1),$$

$$D_B < D_A \quad (2).$$

10. A method for producing a membrane electrode assembly comprising a hydrogen ion conductive polymer electrolyte membrane, a pair of catalyst layers arranged on both surfaces of said polymer electrolyte membrane, and a pair of gas diffusion layers, each comprising a fibrous substrate, arranged on the outer surfaces of said catalyst layers, said method comprising a step of producing said fibrous substrate such that a main surface of said fibrous substrate has a larger area than a main surface of said catalyst layer, that said fibrous substrate has a center portion that faces said catalyst layer and a peripheral portion surrounding said center portion, that a thickness $T_A$ of said center portion and a thickness $T_B$ of said peripheral portion have a relation represented by the following expression (1), and that a warp and weft thread count $N_B$ per unit area of said peripheral portion and a warp and weft thread count $N_A$ per unit area of said center portion have a relation represented by the following expression (3):

$$0.7 \leq T_B/T_A \leq 0.9 \quad (1),$$

$$N_B < N_A \quad (3).$$

11. A method for producing a membrane electrode assembly comprising a hydrogen ion conductive polymer electrolyte membrane, a pair of catalyst layers arranged on both surfaces of said polymer electrolyte membrane, and a pair of gas diffusion layers, each comprising a fibrous substrate, arranged on the outer surfaces of said catalyst layers, said method comprising the steps of:

producing said fibrous substrate such that a main surface of said fibrous substrate has a larger area than a main surface of said catalyst layer, and that said fibrous substrate has a center portion that faces said catalyst layer and a peripheral portion surrounding said center portion; and pressing said peripheral portion, such that a thickness $T_A$ of said center portion and a thickness $T_B$ of said peripheral portion have a relation represented by the following expression (1):

$$0.7 \leq T_B/T_A \leq 0.9 \quad (1).$$

12. A method for producing a membrane electrode assembly comprising a hydrogen ion conductive polymer electrolyte membrane, a pair of catalyst layers arranged on both surfaces of said polymer electrolyte membrane, and a pair of gas diffusion layers, each comprising a fibrous substrate, arranged on the outer surfaces of said catalyst layers, said method comprising a step of producing said fibrous substrate comprising a water repellent such that a main surface of said fibrous substrate has a larger area than a main surface of said catalyst layer, that said fibrous substrate has a center portion that faces said catalyst layer and a peripheral portion surroundina said center portion, that a thickness $T_A$ of said center portion and a thickness $T_B$ of said peripheral portion have a relation represented by the following expression (1), and that a water repellent concentration $H_B$ of said peripheral portion and a water repellent concentration $H_A$ of said center portion have a relation represented by the following expression (4):

$$0.7 \leq T_B/T_A \leq 0.9 \quad (1),$$

$$H_B > H_A \quad (4).$$

* * * * *